US012712915B2

(12) United States Patent
Li

(10) Patent No.: US 12,712,915 B2
(45) Date of Patent: Aug. 18, 2026

(54) HONEYPOT NETWORK OPERATION METHOD AND APPARATUS, DEVICE, AND STORAGE MEDIUM

(71) Applicant: Jingdong Technology Information Technology Co., Ltd., Beijing (CN)

(72) Inventor: Xiao Li, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 44 days.

(21) Appl. No.: 18/851,141

(22) PCT Filed: Feb. 3, 2023

(86) PCT No.: PCT/CN2023/074348
§ 371 (c)(1),
(2) Date: Sep. 26, 2024

(87) PCT Pub. No.: WO2023/193513
PCT Pub. Date: Oct. 12, 2023

(65) Prior Publication Data

US 2025/0039237 A1 Jan. 30, 2025

(30) Foreign Application Priority Data

Apr. 7, 2022 (CN) ........................ 202210373820.X

(51) Int. Cl.
*H04L 29/06* (2006.01)
*H04L 9/40* (2022.01)

(52) U.S. Cl.
CPC ...... *H04L 63/1491* (2013.01); *H04L 63/1425* (2013.01)

(58) Field of Classification Search
None
See application file for complete search history.

(56) References Cited

U.S. PATENT DOCUMENTS 10,395,031 B2 * 8/2019 Shyamsunder ......... G06F 21/56
10,440,054 B2 * 10/2019 Robertson ........... H04L 63/0407

(Continued)

FOREIGN PATENT DOCUMENTS

CN 107370756 A 11/2017
CN 107426242 A 12/2017

(Continued)

OTHER PUBLICATIONS

Naik, Nitin et al. Threat-Aware Honeypot for Discovering and Predicting Fingerprinting Attacks Using Principal Components Analysis. 2018 IEEE Symposium Series on Computational Intelligence (SSCI). https://ieeexplore.ieee.org/stamp/stamp.jsp?tp=& arnumber=8628658 (Year: 2018).*

(Continued)

*Primary Examiner* — Jeremiah L Avery
(74) *Attorney, Agent, or Firm* — Nixon Peabody LLP

(57) ABSTRACT

A honeypot network operation method and apparatus, a device and a storage medium are provided. An implementation of the method comprises: obtaining attack traffic for a service machine; forwarding the attack traffic to a honeypot container corresponding to the service machine, where a container address of the honeypot container is the same as a service address of the service machine, the service address is a network address of the service machine, and the container address is a network address of the honeypot container; and returning virtual data generated by the honeypot container, where the virtual data is data requested by the attack traffic, and the virtual data comprises the container address.

13 Claims, 3 Drawing Sheets

(56) References Cited

U.S. PATENT DOCUMENTS

| | | | | |
|---|---|---|---|---|
| 10,972,503 | B1 * | 4/2021 | Mohan | H04L 63/14 |
| 11,520,907 | B1 * | 12/2022 | Borowiec | G06F 3/067 |
| 2013/0133072 | A1 * | 5/2013 | Kraitsman | H04L 63/1433 726/23 |
| 2014/0115706 | A1 * | 4/2014 | Silva | G06F 9/45533 726/23 |
| 2017/0223052 | A1 | 8/2017 | Stutz | |
| 2017/0331858 | A1 * | 11/2017 | Clark, III | H04L 63/1416 |
| 2018/0159701 | A1 * | 6/2018 | Krause | H04L 61/2514 |
| 2019/0081980 | A1 | 3/2019 | Luo | |
| 2020/0389487 | A1 | 12/2020 | Zhauniarovich | |
| 2021/0011985 | A1 * | 1/2021 | Korotaev | H04L 63/1491 |
| 2021/0026947 | A1 * | 1/2021 | Korotaev | G06F 9/4856 |
| 2021/0194853 | A1 | 6/2021 | Xiao et al. | |
| 2021/0382992 | A1 * | 12/2021 | Massiglia | G06F 21/554 |
| 2021/0382995 | A1 * | 12/2021 | Massiglia | G06F 3/0659 |
| 2022/0050898 | A1 * | 2/2022 | Rokade | G06F 11/1469 |
| 2022/0083657 | A1 * | 3/2022 | Karr | G06F 11/108 |
| 2022/0092180 | A1 * | 3/2022 | Richardson | G06F 11/108 |

FOREIGN PATENT DOCUMENTS

| | | | |
|---|---|---|---|
| CN | 107819731 | A | 3/2018 |
| CN | 109067780 | A | 12/2018 |
| CN | 109768993 | A | 5/2019 |
| CN | 110035079 | A | 7/2019 |
| CN | 110851827 | A | 2/2020 |
| CN | 110881052 | A | 3/2020 |
| CN | 113904852 | A | 1/2022 |
| CN | 115065495 | A | 9/2022 |
| EP | 2713581 | A1 | 4/2014 |
| JP | 2021111857 | A | 8/2021 |
| WO | WO 2019/127141 | A1 | 7/2019 |

OTHER PUBLICATIONS

Shimoda, Akihiro et al. Sensor in the Dark: Building Untraceable Large-Scale Honeypots Using Virtualization Technologies. 2010 10th IEEE/IPSJ International Symposium on Applications and the Internet. https://ieeexplore.ieee.org/stamp/stamp.jsp?tp=&arnumber=5598179 (Year: 2010).*

Vasilomanolakis, Emmanouil et al. Probe-response attacks on collaborative intrusion detection systems: Effectiveness and countermeasures. 2015 IEEE Conference on Communications and Network Security (CNS). https://ieeexplore.ieee.org/stamp/stamp.jsp?tp=&arnumber=7346892 (Year: 2015).*

China National Intellectual Property Administration; International Search Report of International Searching Authority for International Patent Application No. PCT/CN2023/074348, mailed Apr. 19, 2023, with English language translation of Search Report (9 pages).

Examination Report in Singaporean Patent Application No. 11202406738Q, dated Feb. 23, 2026 (2 pages).

* cited by examiner

HONEYPOT NETWORK OPERATION METHOD AND APPARATUS, DEVICE, AND STORAGE MEDIUM

CROSS-REFERENCE TO RELATED APPLICATIONS

The present patent application is a U.S. National Stage of International Application No. PCT/CN2023/074348, filed on Feb. 3, 2023, which claims the benefit of and priority to Chinese Patent Application No. 202210373820.X, filed on Apr. 7, 2022. All of the aforementioned applications are hereby incorporated by reference herein in their entireties.

TECHNICAL FIELD

The present disclosure relates to the field of network security technology and, in particular, to a method and apparatus for operating a honeypot network, a device and a storage medium.

BACKGROUND

With the rapid development of the Internet industry, incidents of intrusion attacks on the network environment are rising, thus giving rise to honeypot network-based defence products. By deploying a honeypot product in a service subnet, the product is used to disguise vulnerable services, triggering an alert when an attacker accesses the honeypot service. As a honeypot network generated by the honeypot product has no connection with the current service subnet environment, and considering security of the entire service subnet, the honeypot environment generated by the honeypot product often needs to be isolated from the service subnet, or even directly deploy the honeypot network to a cloud server.

SUMMARY

The present disclosure provides a method and apparatus for operating a honeypot network, a device and a storage medium.

According to a first aspect of the present disclosure, a method for operating a honeypot network is provided, including: acquiring attack traffic for a service machine; forwarding the attack traffic to a honeypot container corresponding to the service machine, where a container address of the honeypot container is the same as a service address of the service machine, the service address is a network address of the service machine, and the container address is a network address of the honeypot container; and returning virtual data generated by the honeypot container, where the virtual data is data requested by the attack traffic, and the virtual data includes the container address.

According to a second aspect of the present disclosure, an apparatus for operating a honeypot network is provided, including: an acquisition module, configured to acquire attack traffic for a service machine; a forwarding module, configured to forward the attack traffic to a honeypot container corresponding to the service machine, where a container address of the honeypot container is the same as a service address of the service machine, the service address is a network address of the service machine, and the container address is a network address of the honeypot container; and a returning module, configured to return virtual data generated by the honeypot container, where the virtual data is data requested by the attack traffic, and the virtual data includes the container address.

According to a third aspect of the present disclosure, an electronic device is provided, including: a memory, a processor and a computer program stored on the memory and executable on the processor, the program, when executed by the processor, implements steps of the method for operating a honeypot network as described in any of the foregoing.

According to a fourth aspect of the present disclosure, a non-transitory computer readable storage medium is provided, storing a computer program thereon, where, the computer program, when executed by a processor, implements steps of the method for operating a honeypot network as described in any of the foregoing.

BRIEF DESCRIPTION OF THE DRAWINGS

In order to illustrate the technical solutions in the present disclosure or in the existing technology more clearly, the following will briefly introduce the accompanying drawings that need to be used in the description of embodiments or the existing technology, it is obvious that the accompanying drawings in the following description are some embodiments of the present disclosure, and that other accompanying drawings may be obtained in accordance with these accompanying drawings without creative labour for those of ordinary skill in the art.

DETAILED DESCRIPTION OF EMBODIMENTS

In order to make the objectives, technical solutions and advantages of embodiments of the present disclosure clearer, the technical solutions in the embodiments of the present disclosure will be clearly described below in conjunction with the accompanying drawings in the embodiments of the present disclosure, and it is obvious that the described embodiments are a part of embodiments of the embodiments of the present disclosure and not all of the embodiments. Based on the embodiments in the embodiments of the present disclosure, all other embodiments obtained by those of ordinary skill in the art without creative labour fall within the scope of protection of the embodiments of the present disclosure.

Figure 1:
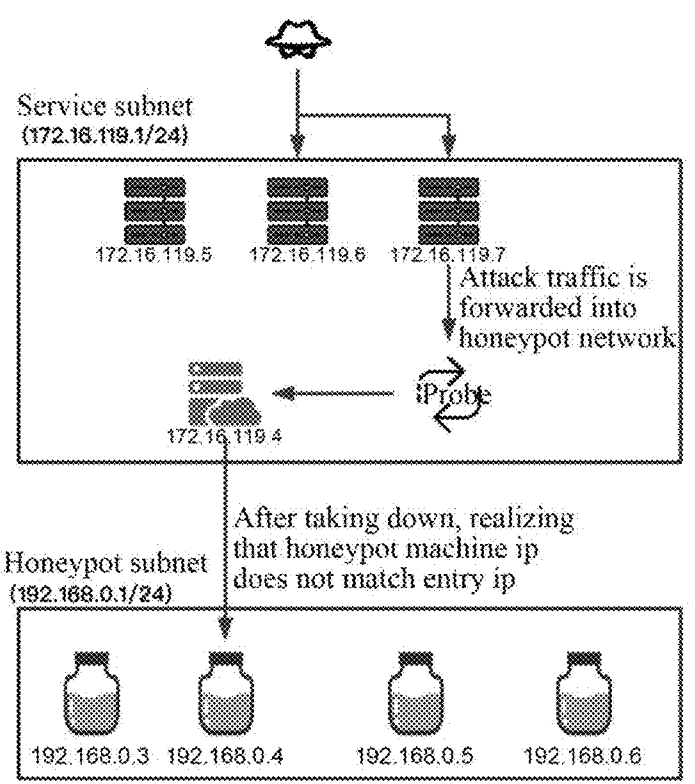
FIG. 1 is a diagram of an example honeypot network constructed in existing technology.

FIG. 1 illustrates a honeypot network. In this network, a service subnet occupies a service network segment from 172.16.119.1 to 172.16.119.24 (i.e., 172.16.119.1/24), 172.16.119.5, 172.16.119.6, and 172.16.119.7 are network addresses of different service machines in the service subnet, respectively, and 172.16.119.4 is a honeypot host provided in the service subnet. A honeypot subnet is constructed through the honeypot host, which occupies a service network segment from 192.168.0.1 to 192.168.0.24 (i.e., 192.168.0.1/24). 192.168.0.3, 192.168.0.4, 192.168.0.5, and 192.168.0.6, denote network addresses of different honeypot containers in the honeypot subnet, respectively.

When an attacker attacks the service subnet, as shown in FIG. 1, and attacks a service machine with the network address 172.16.119.7, a probe forwards attack traffic on the service machine to the secret network (i.e., the honeypot subnet), and a honeypot container with the address 192.168.0.4 in the honeypot subnet provides a virtual service. However, after attacking the current service subnet to take down the service in the honeypot container, the attacker may realize that the address of the current network segment is not in the same network segment as a previous service, and that the previous service of the service machine cannot be accessed. The attacker is likely to realize that he/she is in a honeynet environment and thus stops attacking the honeypot machine and goes to attack other service machines.

The present disclosure provides a new method for operating a honeypot network, such that the honeypot container and the service machine have the same network address. The method for operating a honeypot network provided by embodiments of the present disclosure is described below in conjunction with FIG. 2 to FIG. 4, using the honeypot host as an executing body.

Figure 2:
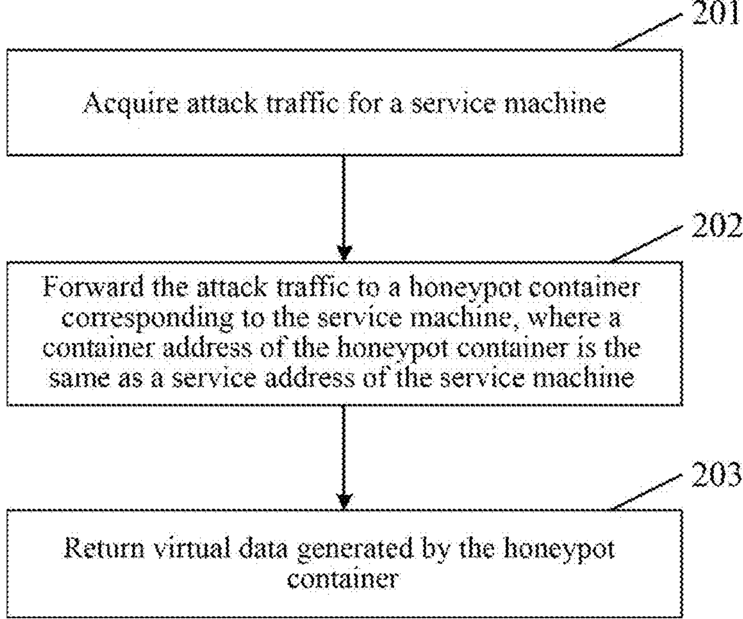
FIG. 2 is a schematic flowchart of a method for operating a honeypot network according to an embodiment of the present disclosure.

In an embodiment, as shown in FIG. 2, the method for operating a honeypot network is implemented as follows when applied to a honeypot host.

Step 201, acquiring attack traffic for a service machine.

In the present embodiment, the attack traffic refers to malicious access traffic of an attacker accessing the service machine. After receiving the attack traffic, the service machine may send the attack traffic to the honeypot host by using a preset shunt method, so that the honeypot host may process the attack traffic.

In the present embodiment, the service machine refers to a machine that runs services of a real service. Each service machine has a corresponding network address for implementing multiple services. Alternatively, the network address may be an Internet Protocol Address (IP address). The honeypot host refers to a host used to create honeypot containers, and may be deployed in the same subnet as the real service machine.

Step 202, forwarding the attack traffic to a honeypot container corresponding to the service machine, where a container address of the honeypot container is the same as a service address of the service machine, the service address is a network address of the service machine, and the container address is a network address of the honeypot container.

In the present embodiment, the honeypot container corresponding to the service machine is pre-created within the honeypot host. The honeypot container refers to vulnerable World Wide Web (Web) services or Secure Shell Protocol (SSH) services, etc., with the intention of allowing attackers to launch attacks against it, drawing fire and delaying the attackers from launching attacks against other real services. After acquiring the attack traffic, the honeypot host forwards the attack traffic to the honeypot container corresponding to the service machine, so that the honeypot container provides services that the attack traffic needs to access, avoiding the attackers from accessing the service machine and ensuring safe operation of the service machine.

Step 203, returning virtual data generated by the honeypot container, where the virtual data is data requested by the attack traffic, and the virtual data includes the container address.

In the present embodiment, the data needed for the attack traffic, i.e., the virtual data, is generated by the honeypot container, to create an illusion of successful access by the attacker. If the attack traffic sent by the attacker requests the network address, the virtual data returned includes the container address. Since the network address of the honeypot container is the same as the network address of the service machine, the attacker may not find that he/she has fallen into a honeypot environment even if he/she obtains the container address of the honeypot container, thus enhancing a confusing nature of the whole honeypot environment and ensuring security of the service machine.

In an embodiment, the honeypot container needs to be pre-created. Alternatively, before acquiring the attack traffic for a service machine, the honeypot host may acquire the service address of the service machine; and create the honeypot container corresponding to the service machine based on the service address.

In the present embodiment, when deploying the entire honeypot network, the honeypot host may acquire the service address of the service machine, and then create a honeypot container corresponding to the service machine based on the service address. The created honeypot container has a honeypot address that is the same as the service address of the service machine. After the honeypot container is created, the honeypot host may realize the processing of the attack traffic by using the honeypot container.

In an embodiment, data transmission between the honeypot host and the service machine is achieved via a probe. Alternatively, the acquiring the service address of the service machine, is implemented as: acquiring the service address transmitted by a probe, where the probe is located at the service machine, and the probe is used to acquire and forward the service address of the service machine. The acquiring attack traffic of a service machine, is implemented as: acquiring the attack traffic transmitted by the probe, where the probe is also used to forward the attack traffic accessing the service machine.

In the present embodiment, the honeypot host is connected to the probe on the service machine, which may complete data interaction. The probe is deployed on the real service machine, occupying a port of the service machine.

The probe is a module pre-deployed on the service machine, and the data transmission between the service machine and the honeypot host is achieved via the probe. On the one hand, the probe may forward the attack traffic accessing the service machine to the honeypot host, i.e., the service machine sends the attack traffic to the probe, after receiving the attack traffic, the probe then sends the attack traffic to the honeypot host, and the honeypot host completes the processing of the attack traffic. On the other hand, in the phase of creating the honeypot container, the probe may acquire the service address from the service machine where it is located, then transmit the service address to the honeypot host, and the honeypot host may acquire the service address transmitted by the probe to complete the creation of the honeypot container.

In the present embodiment, the honeypot host may acquire both the attack traffic and the service address via the probe. Compared to existing technology in which the probe is only used to forward the attack traffic, the probe in the present embodiment implements more functions, improves a utilization rate of the probe, and reduces waste of resources.

In an embodiment, before acquiring the service address of the service machine: acquiring the service network segment of the service subnet, where the service network segment includes at least one network address occupied by the service subnet; setting up an application container engine based on the service network segment, where the application container engine is used to create the honeypot container corresponding to the network address based on the network address in the service network segment. The creating the honeypot container corresponding to the service machine based on the service address, alternatively includes, invoking, after determining that the service address belongs to the service network segment, the application container engine to create the honeypot container corresponding to the service machine.

In the present embodiment, after the honeypot host is deployed on the service subnet, the honeypot host may execute a command, such as an ifconfig command, for acquiring network interface configuration information, to acquire the service network segment occupied by the service subnet, for example, the service network segment is 172.16.119.1/24. The service network segment is stored into a memory that can be accessed by the honeypot host. After acquiring the service network segment, the honeypot host may set up the application container engine (docker) based on the service network segment. Then, the honeypot host may create the honeypot network by means of docker.

Alternatively, the honeypot host may set a docker startup method based on the acquired service network segment. If the service address obtained by the honeypot host belongs to an already stored service network segment, docker is automatically started and the honeypot container is dynamically created. A command to set the docker startup method may take the following statement: docker network create --subnet=172.16.0.0/16 test; here, 172.16.0.0/16 may be replaced with an arbitrary service network segment as appropriate and needed, for example, replaced with 172.16.119.1/24.

Through the above process, it may be simply realized that every time a honeypot is deployed, the network environment of the honeypot network can automatically acquire information of the service network segment, so as to keep the network segment of the honeypot network consistent with the service network segment.

In an embodiment, in order to increase flexibility and diversity of the created honeypot network, before the creating the honeypot container corresponding to the service machine based on the service address: acquiring a honeypot custom directive for creating the honeypot container corresponding to the service machine, where the honeypot custom directive includes an execution manner and a service type of the honeypot container. The creating the honeypot container corresponding to the service machine based on the service address, alternatively includes, creating, based on the service address, the honeypot container corresponding to the service machine in the execution manner and the service type in the honeypot custom directive, where the honeypot service includes a virtual service established in the service type. After forwarding the attack traffic to a honeypot container corresponding to the service machine, executing the virtual service in the execution manner based on the attack traffic. The virtual data is generated by the virtual service and then the virtual data is returned to the attacker.

In the present embodiment, the honeypot host provides custom services. Before creating the honeypot container, the honeypot host acquires the honeypot custom directive, which includes the execution manner and the service type of the honeypot container. When creating the honeypot container, in the execution manner and the service type in the honeypot custom directive, the honeypot container corresponding to the service machine is created. For example, the honeypot custom directive instructs to execute a Web service in the honeypot container in the execution manner of shiro command. When the probe forwards the attack traffic for the service machine to the honeypot host, the honeypot host distributes the attack traffic to the honeypot container corresponding to the service machine and executes the Web service in the honeypot container according to the customized shiro command. The Web service then generates the virtual data and returns the data to the attacker, creating an illusion of successful access by the attacker and providing more time for anti-attack processes such as attack traceability.

In an embodiment, the attack traffic of the service machine needs to pass through the port, and be forwarded by the probe to the honeypot host. Alternatively, after the probe transmits the service address to the honeypot host, the probe acquires the attack traffic for the service machine from a custom port, where a connection relationship between the custom port and the probe is set up through a port custom directive; and the probe transmits the attack traffic to the honeypot host.

In the present embodiment, the port for forwarding the attack traffic on the service machine may be customized as appropriate and/as needed. For example, the custom port is port 8080 on the service machine. The custom port increases flexibility in the operation of the honeypot network. At the same time, by designating the custom port, it is easier to monitor malicious attacks against the service subnet through the custom port, as well as easier to collect the attack traffic, implementing other data processing processes such as security alerts, or attack traceability.

In an embodiment, one service subnetwork includes at least one service machine, and the honeypot network is for the entire service subnet, that is, it needs to create a corresponding honeypot container for each service machine. For each service machine, the probe and the service machine are in one-to-one correspondence, i.e., a corresponding probe is deployed on each service machine. Each probe maintains connection with the honeypot host. Then, the acquiring the service address transmitted by a probe, alternatively includes, acquiring at least one service address transmitted by at least one probe respectively, where, the at least one probe is located on the at least one service machine respectively. The creating the honeypot container corresponding to the service machine based on the service address, alternatively includes, creating the honeypot container(s) respectively corresponding to the at least one service machine based on the at least one service address. The acquiring the attack traffic transmitted by the probe, alternatively includes, acquiring the attack traffic transmitted by the at least one probe, respectively targeting at the at least one service machine. The forwarding the attack traffic to a honeypot container corresponding to the service machine, alternatively includes, forwarding the attack traffic respectively targeting at the at least one service machine to the honeypot container(s) respectively corresponding to the at least one service machine, respectively.

In the present embodiment, when honeypot containers generate the virtual data corresponding to service machines, the honeypot host returns the corresponding virtual data, respectively, to the attacker accessing the service machines. The honeypot containers in the entire honeypot network are in one-to-one correspondence with the service machines in the service subnet, which achieves consistency between the honeypot network and the service subnet, improves the confusing nature and simulation of the honeypot network, and further ensures the security of the service subnet.

In an embodiment, in order to further ensure the consistency between the honeypot network and the service subnet, after creating the honeypot container(s) respectively corresponding to at least one service machine based on at least one service address: sending, at intervals of a preset duration, heartbeat information to N to-be-monitored probes, where the heartbeat information is sent to each of the to-be-monitored probes at intervals of the preset duration, where, the to-be-monitored probes refer to probes connected to the honeypot host, the N to-be-monitored probes are located at N service machines respectively, and N is an integer greater than or equal to 1; acquiring feedback information returned by M to-be-monitored probes, determining that the M to-be-monitored probes are active probes, where, active probes are properly functioning probes, and M is an integer greater than or equal to 1 and less than or equal to N; determining at least one newly added probe in the M active probes, where, a newly added probe is a probe corresponding to a newly added service machine for which a corresponding honeypot container has not been created; acquiring a newly added service address transmitted by each newly added probe respectively; and creating the honeypot container corresponding to each newly added service machine respectively, based on each newly added service address.

In the present embodiment, the honeypot host may monitor the probe on each service machine through the heartbeat information. When a service machine is operating and the probe is normal, the probe is able to return feedback information to the honeypot host after receiving the heartbeat information, but when the service machine is not operating, or the probe is abnormal, no feedback information is returned.

During the operation of the honeypot host, the honeypot host is capable of monitoring changes in the service subnet by periodically sending the heartbeat information to each probe. If a new service machine is added to the service subnet and a probe is deployed on this service machine, the honeypot host may acquire the newly added service address of the newly added service machine by using the newly added probe. Then, the honeypot host creates a new honeypot container corresponding to the newly added service machine.

In the above process, the honeypot host is not only capable of monitoring a survival state of the probe, but is also capable of realizing dynamic adjustment of the honeypot network, i.e., when a service machine is added to the service subnet, i.e., a honeypot container can be added to the honeypot network accordingly in real time, which ensures the consistency of the service subnet with the honeypot network. When an attacker is in the honeypot network, since the honeypot container has the same network address as the service machine, and the attacker is also capable of accessing other services in the same network segment, it is extremely difficult for the attacker to detect the existence of the honeypot network, which greatly improves the simulation of the honeypot environment, making the attacker fall deep into the honeypot, and providing more data support for subsequent traceability.

Figure 3:
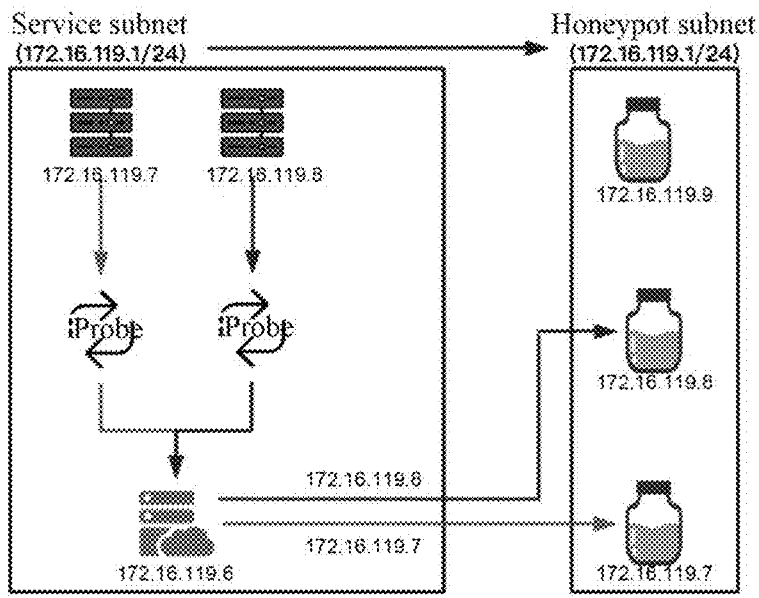
FIG. 3 is a diagram of an example network implemented by the method for operating a honeypot network according to an embodiment of the present disclosure.

In an embodiment, in an example network shown in FIG. 3, a service subnet occupies a service network segment from 172.16.119.1 to 172.16.119.24 (i.e., 172.16.119.1/24), and 172.16.119.7 and 172.16.119.8 are the IP addresses of different service machines in the service subnet, respectively. Each service machine is deployed with a probe respectively. 172.16.119.6 is the IP address of a honeypot host deployed in the service subnet.

The honeypot host executes the ifconfig command to obtain the service network segment of the service subnet as 172.16.119.1/24, and then saves the service network segment. The IP addresses of subsequently created honeypot containers all belong to this service network segment. The honeypot host sets the docker startup method based on the acquired service network segment, and dynamically creates a honeypot network of the same network segment, i.e., a honeypot subnet in FIG. 3 has the same honeypot network segment of 172.16.119.1/24. When an attacker attacks the service subnet, the attacker enters services in the honeypot containers, and may not realize that he/she has already entered the honeypot network, because the honeypot network segment is the same as the service network segment. This method greatly improves the confusing nature of the honeypot network.

After two probes respectively transmit 172.16.119.7 and 172.16.119.8 to the honeypot host, the honeypot host uses docker to generate corresponding two honeypot containers, which have the IP addresses of 172.16.119.7 and 172.16.119.8, respectively, same as the IP addresses of the two service machines in the service subnet.

Assuming that a new service machine is added to the service subnet, and the IP address of the newly added service machine is 172.16.119.9, the honeypot host obtains the IP address 172.16.119.9 by using the newly added probe, and then generates a new honeypot container of the same IP address 172.16.119.9 using docker, to dynamically adjust the honeypot subnet and ensure the consistency of the honeypot subnet with the service subnet in real time, and enhance the confusing nature of the honeypot subnet.

The method for operating a honeypot network provided by the present disclosure, after acquiring attack traffic for a service machine, forwarding the attack traffic to a honeypot container corresponding to the service machine, where a container address of the honeypot container is the same as a service address of the service machine, the service address is a network address of the service machine, and the container address is a network address of the honeypot container; and finally returning virtual data generated by the honeypot container, where the virtual data is data requested by the attack traffic, and the virtual data includes the container address. In the honeypot network constructed through the above process, the container address of the honeypot container is the same as the service address of the service machine, which avoids the situation that an attacker, after attacking the honeypot network in a service subnet, notices that the network environment is not right through the network address and exits the honeypot network to avoid honeypot monitoring, and returns to attack other real services in the service subnet. After taking down the honeypot container, the attacker mistakenly thinks that he/she has successfully taken down permissions of the service machine, thus, the purpose of confusing the attacker's attack and making him/her fall deep into the honeypot network is achieved, thereby ensuring the security of the service machine.

Figure 4:
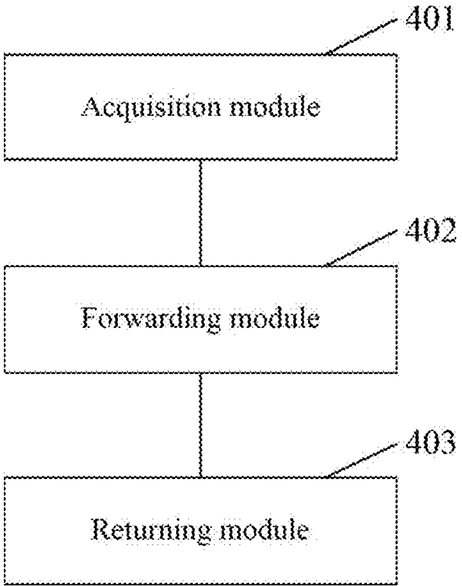
FIG. 4 is a schematic structural diagram of an apparatus for operating a honeypot network according to an embodiment of the present disclosure.

A honeypot host apparatus for operating a honeypot network provided by an embodiment of the present disclosure is described below, and the apparatus for operating a honeypot network described below may be cross-referenced in correspondence with the method for operating a honeypot network described above. As shown in FIG. 4, the apparatus for operating a honeypot network, includes:

an acquisition module 401, configured to acquire attack traffic for a service machine.

a forwarding module 402, configured to forward the attack traffic to a honeypot container corresponding to the service machine, where a container address of the honeypot container is the same as a service address of the service machine, the service address is a network address of the service machine, and the container address is a network address of the honeypot container; and a returning module 403, configured to return virtual data generated by the honeypot container, where the virtual data is data requested by the attack traffic, and the virtual data includes the container address.

In an embodiment, the apparatus for operating a honeypot network further includes a pre-processing module 404.

The pre-processing module 404 is configured to, before the acquiring attack traffic for a service machine, acquire the service address of the service machine; and create the honeypot container corresponding to the service machine based on the service address.

In an embodiment, the pre-processing module 404, is specifically configured to acquire the service address transmitted by a probe, where the probe is located at the service machine, and the probe is used to acquire and forward the service address of the service machine.

The acquisition module 401, is specifically configured to acquire the attack traffic transmitted by the probe, where the probe is also used to forward the attack traffic accessing the service machine.

In an embodiment, the pre-processing module 404, is further configured to, before the acquiring the service address for the service machine, acquire a service network segment of a service subnet, where the service network segment includes at least one network address occupied by the service subnet; set up an application container engine based on the service network segment, where the application container engine is used to create, based on the network address in the service network segment, the honeypot container corresponding to the network address.

The pre-processing module 404, is specifically configured to invoke, after determining that the service address belongs to the service network segment, the application container engine to create the honeypot container corresponding to the service machine.

In an embodiment, the pre-processing module 404, is further configured to, before the creating the honeypot container corresponding to the service machine based on the service address, acquire a honeypot custom directive for creating the honeypot container corresponding to the service machine, where the honeypot custom directive includes an execution manner and a service type of the honeypot container.

The pre-processing module 404, is specifically configured to create, based on the service address, the honeypot container corresponding to the service machine, based on the service address, in the execution manner and the service type in the honeypot custom directive, where a honeypot service includes a virtual service established in the service type.

The apparatus for operating a honeypot network further includes an execution module 405. The execution module 405 is configured to, after the forwarding the attack traffic to a honeypot container corresponding to the service machine, execute the virtual service in the execution manner based on the attack traffic.

In an embodiment, the pre-processing module 404, is specifically configured to acquire at least one service address transmitted by at least one probe respectively, where the at least one probe is located on at least one service machine respectively; and a honeypot container respectively corresponding to the at least one service machine based on the at least one service address.

The acquisition module 401, is specifically configured to acquire the attack traffic transmitted by the at least one probe, respectively targeting at the at least one service machine.

The forwarding module 402, is specifically configured to forward the attack traffic respectively targeting at the at least one service machine, to the honeypot container respectively corresponding to the at least one service machine, respectively.

In an embodiment, the apparatus for operating a honeypot network further includes a real-time processing module 406. The real-time processing module 406, is configured to, after the creating a honeypot container respectively corresponding to the at least one service machine based on at least one service address, send heartbeat information to N to-be-monitored probes at intervals of a preset duration, where the heartbeat information is sent to each of the to-be-monitored probes at intervals of a preset duration, where the to-be-monitored probes refer to probes connected to a honeypot host, the N to-be-monitored probes are located at N service machines respectively, and N is an integer greater than or equal to 1; acquire feedback information returned by M to-be-monitored probes, determine that the M to-be-monitored probes are active probes, where the active probes are properly functioning probes, and M is an integer greater than or equal to 1 and less than or equal to N; determine at least one newly added probe in the M active probes, where the newly added probe is a probe corresponding to a newly added service machine for which a corresponding honeypot container has not been created; acquire each newly added service address transmitted by each newly added probe respectively; and create a honeypot container corresponding to the each newly added service machine respectively, based on the each newly added service address.

Figure 5:
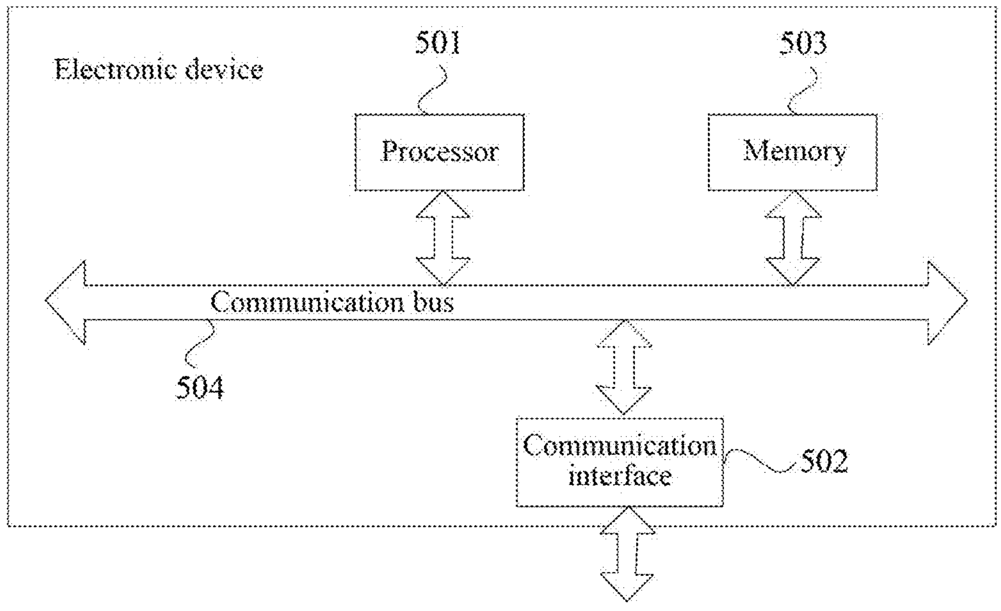
FIG. 5 is a schematic structural diagram of an electronic device according to an embodiment of the present disclosure.

FIG. 5 exemplifies a schematic diagram of a physical structure of an electronic device, as shown in FIG. 5, the electronic device may include: a processor 501, a communication interface 502, a memory 503, and a communication bus 504, where the processor 501, the communication interface 502, and the memory 503 achieve communication with each other via the communication bus 504. The processor 501 may invoke logic instructions in the memory 503 to perform the method for operating a honeypot network, the method including: acquiring attack traffic for a service machine; forwarding the attack traffic to a honeypot container corresponding to the service machine, where a container address of the honeypot container is the same as a service address of the service machine, the service address is a network address of the service machine, and the container address is a network address of the honeypot container; and returning virtual data generated by the honeypot container, where the virtual data is data requested by the attack traffic, and the virtual data includes the container address.

In addition, the logic instructions in the memory 503 may be stored in a computer readable storage medium when implemented in the form of a software function unit and sold or used as an independent product. Based on this understanding, the technical solution of the embodiments of the present disclosure may be embodied in the form of a software product that is essentially or contributes to the existing technology, or parts of the technical solution may be embodied in the form of a software product, which is stored in a storage medium and includes a number of instructions to cause a computer device (which may be a personal computer, a server, or a network device, etc.) to perform all or some of the steps of the method described in the various embodiments of the present disclosure. The aforementioned storage medium includes a USB flash drive, a removable hard disk, a read-only memory (ROM), a random access memory (RAM), a magnetic disc or a compact disc, and other kinds of mediums that can store program codes.

In another aspect, the present disclosure also provides a computer program product, the computer program product includes a computer program stored on a non-transitory computer readable storage medium, the computer program includes program instructions, the program instructions, when executed by a computer, cause the computer to perform the method for operating a honeypot network provided by the methods described above, the method including: acquiring attack traffic for a service machine; forwarding the attack traffic to a honeypot container corresponding to the service machine, where a container address of the honeypot container is the same as a service address of the service machine, the service address is a network address of the service machine, and the container address is a network address of the honeypot container; and returning virtual data generated by the honeypot container, where the virtual data is data requested by the attack traffic, and the virtual data includes the container address.

In yet another aspect, the present disclosure also provides a non-transitory computer readable storage medium, storing a computer program thereon, the computer program, when executed by a processor, implements to perform the method for operating a honeypot network provided by the above, the method including: acquiring attack traffic for a service machine; forwarding the attack traffic to a honeypot container corresponding to the service machine, where a container address of the honeypot container is the same as a service address of the service machine, the service address is a network address of the service machine, and the container address is a network address of the honeypot container; and returning virtual data generated by the honeypot container, where the virtual data is data requested by the attack traffic, and the virtual data includes the container address.

The apparatus embodiment described above is merely schematic, where the units illustrated as separated components may or may not be physically separated, and the components shown as units may or may not be physical units, i.e., they may be located in one place or they may also be distributed over a plurality of network units. Some or all of these modules may be selected to achieve the purpose of the present embodiment solution according to actual needs, which may be understood and implemented without creative labour by those of ordinary skill in the art.

Through the above description of the embodiments, it is clear to those skilled in the art that the embodiments may be realized with the aid of software plus a requisite common hardware platform, and of course also through hardware. Based on this understanding, parts of the above technical solution that are essential or contributes to the existing technology may be embodied in the form of a software product, and the computer software product may be stored in a computer readable storage medium such as a ROM/RAM, a magnetic disc or a compact disc, and includes a number of instructions to enable a computer device (which may be a personal computer, a server, or a network device, etc.) to perform the method described in the embodiments or certain parts of embodiments.

Finally, it should be noted that the above embodiments are only used to illustrate the technical solution of the present disclosure, rather than limiting them; although the present disclosure has been described in detail with reference to the foregoing embodiments, those of ordinary skill in the art should understand that it is still possible to make modifications to the technical solution documented in the foregoing embodiments, or to make equivalent substitutions for some of the technical features therein; and such modifications or substitutions do not take the essence of the corresponding technical solution out of the spirit and the scope of the technical solution of the embodiments of the present disclosure.

What is claimed is:

1. A method for operating a honeypot network, the method comprising:

after creating honeypot containers respectively corresponding to service machines based on service addresses of the service machines, sending, at intervals of a preset duration, heartbeat information to N to-be-monitored probes, wherein the heartbeat information is sent to each of the to-be-monitored probes at intervals of the preset duration, wherein the to-be-monitored probes refer to probes connected to a honeypot host, the N to-be-monitored probes are located at N service machines respectively, N is an integer greater than or equal to 1, and each probe is used to acquire and forward a service address of a corresponding service machine;

acquiring feedback information returned by M to-be-monitored probes, determining that the M to-be-monitored probes are active probes, wherein the active probes are properly functioning probes, and M is an integer greater than or equal to 1 and less than or equal to N;

determining at least one newly added probe in the M active probes, wherein the newly added probe is a probe corresponding to a newly added service machine for which a corresponding honeypot container has not been created;

acquiring each newly added service address transmitted by each newly added probe respectively;

creating a honeypot container corresponding to the each newly added service machine respectively, based on the each newly added service address;

acquiring attack traffic for a service machine;

forwarding the attack traffic to a honeypot container corresponding to the service machine, wherein a container address of the honeypot container is the same as a service address of the service machine, the service address is a network address of the service machine, and the container address is a network address of the honeypot container; and returning virtual data generated by the honeypot container, wherein the virtual data is data requested by the attack traffic, and the virtual data comprises the container address.

2. The method for operating a honeypot network according to claim 1, wherein, before the acquiring attack traffic for a service machine, the method further comprises:

acquiring the service address of the service machine; and creating the honeypot container corresponding to the service machine based on the service address.

3. The method for operating a honeypot network according to claim 2, wherein, the acquiring the service address of the service machine, comprises:

acquiring the service address transmitted by a probe, wherein the probe is located at the service machine, and the probe is used to acquire and forward the service address of the service machine; and the acquiring attack traffic for a service machine, comprises:

acquiring the attack traffic transmitted by the probe, wherein the probe is also used to forward the attack traffic accessing the service machine.

4. The method for operating a honeypot network according to claim 2, wherein, before the acquiring the service address for the service machine, the method further comprises:

acquiring a service network segment of a service subnet, wherein the service network segment comprises at least one network address occupied by the service subnet;

setting up an application container engine based on the service network segment, wherein the application container engine is used to create, based on the network address in the service network segment, the honeypot container corresponding to the network address; and the creating the honeypot container corresponding to the service machine based on the service address, comprises:

invoking, after determining that the service address belongs to the service network segment, the application container engine to create the honeypot container corresponding to the service machine.

5. The method for operating a honeypot network according to claim 2, wherein, before the creating the honeypot container corresponding to the service machine based on the service address, the method further comprises:

acquiring a honeypot custom directive for creating the honeypot container corresponding to the service machine, wherein the honeypot custom directive comprises an execution manner and a service type of the honeypot container; and the creating the honeypot container corresponding to the service machine based on the service address, comprises:

creating, based on the service address, the honeypot container corresponding to the service machine, in the execution manner and the service type in the honeypot custom directive, wherein a honeypot service comprises a virtual service established in the service type; and after the forwarding the attack traffic to a honeypot container corresponding to the service machine, the method further comprises:

executing the virtual service in the execution manner based on the attack traffic.

6. The method for operating a honeypot network according to claim 3, wherein, the acquiring the service address transmitted by a probe, comprises:

acquiring at least one service address transmitted by at least one probe respectively, wherein the at least one probe is located on at least one service machine respectively;

the creating the honeypot container corresponding to the service machine based on the service address, comprises:

creating a honeypot container respectively corresponding to the at least one service machine based on the at least one service address;

the acquiring the attack traffic transmitted by the probe, comprises:

acquiring the attack traffic transmitted by the at least one probe, respectively targeting at the at least one service machine; and the forwarding the attack traffic to a honeypot container corresponding to the service machine, comprises:

forwarding the attack traffic respectively targeting at the at least one service machine, to the honeypot container respectively corresponding to the at least one service machine, respectively.

7. An apparatus for operating a honeypot network, the apparatus comprising:

at least one processor; and a memory storing instructions which, when executed by the at least one processor, cause the at least one processor to perform operations, the operations comprising:

after creating honeypot containers respectively corresponding to service machines based on service addresses of the service machines, sending, at intervals of a preset duration, heartbeat information to N to-be-monitored probes, wherein the heartbeat information is sent to each of the to-be-monitored probes at intervals of the preset duration, wherein the to-be-monitored probes refer to probes connected to a honeypot host, the N to-be-monitored probes are located at N service machines respectively, N is an integer greater than or equal to 1, and each probe is used to acquire and forward a service address of a corresponding service machine;

acquiring feedback information returned by M to-be-monitored probes, determining that the M to-be-monitored probes are active probes, wherein the active probes are properly functioning probes, and M is an integer greater than or equal to 1 and less than or equal to N;

determining at least one newly added probe in the M active probes, wherein the newly added probe is a probe corresponding to a newly added service machine for which a corresponding honeypot container has not been created;

acquiring each newly added service address transmitted by each newly added probe respectively:

creating a honeypot container corresponding to the each newly added service machine respectively, based on the each newly added service address;

acquiring attack traffic for a service machine;

forwarding the attack traffic to a honeypot container corresponding to the service machine, wherein a container address of the honeypot container is the same as a service address of the service machine, the service address is a network address of the service machine, and the container address is a network address of the honeypot container; and returning virtual data generated by the honeypot container, wherein the virtual data is data requested by the attack traffic, and the virtual data comprises the container address.

8. The apparatus for operating a honeypot network according to claim 7, wherein, before the acquiring attack traffic for a service machine, the operations further comprise:

acquiring the service address of the service machine; and creating the honeypot container corresponding to the service machine based on the service address.

9. The apparatus for operating a honeypot network according to claim 8, wherein, the acquiring the service address of the service machine, comprises:

acquiring the service address transmitted by a probe, wherein the probe is located at the service machine, and the probe is used to acquire and forward the service address of the service machine; and the acquiring attack traffic for a service machine, comprises:

acquiring the attack traffic transmitted by the probe, wherein the probe is also used to forward the attack traffic accessing the service machine.

10. The apparatus for operating a honeypot network according to claim 8, wherein, before the acquiring the service address for the service machine, the operations further comprise:

acquiring a service network segment of a service subnet, wherein the service network segment comprises at least one network address occupied by the service subnet;

setting up an application container engine based on the service network segment, wherein the application container engine is used to create, based on the network address in the service network segment, the honeypot container corresponding to the network address; and the creating the honeypot container corresponding to the service machine based on the service address, comprises:

invoking, after determining that the service address belongs to the service network segment, the application container engine to create the honeypot container corresponding to the service machine.

11. The apparatus for operating a honeypot network according to claim 8, wherein, before the creating the honeypot container corresponding to the service machine based on the service address, the operations further comprise:

acquiring a honeypot custom directive for creating the honeypot container corresponding to the service machine, wherein the honeypot custom directive comprises an execution manner and a service type of the honeypot container;

the creating the honeypot container corresponding to the service machine based on the service address, comprises:

creating, based on the service address, the honeypot container corresponding to the service machine, in the execution manner and the service type in the honeypot custom directive, wherein a honeypot service comprises a virtual service established in the service type; and after the forwarding the attack traffic to a honeypot container corresponding to the service machine, the operations further comprise:

executing the virtual service in the execution manner based on the attack traffic.

12. The apparatus for operating a honeypot network according to claim 9, wherein, the acquiring the service address transmitted by a probe, comprises:

acquiring at least one service address transmitted by at least one probe respectively, wherein the at least one probe is located on at least one service machine respectively;

the creating the honeypot container corresponding to the service machine based on the service address, comprises:

creating a honeypot container respectively corresponding to the at least one service machine based on the at least one service address;

the acquiring the attack traffic transmitted by the probe, comprises:

acquiring the attack traffic transmitted by the at least one probe, respectively targeting at the at least one service machine; and the forwarding the attack traffic to a honeypot container corresponding to the service machine, comprises:

forwarding the attack traffic respectively targeting at the at least one service machine, to the honeypot container respectively corresponding to the at least one service machine, respectively.

13. A non-transitory computer readable storage medium, storing a computer program thereon, wherein, the computer program, when executed by a processor, performs operations, the operations comprising:

after creating honeypot containers respectively corresponding to service machines based on service addresses of the service machines, sending, at intervals of a preset duration, heartbeat information to N to-be-monitored probes, wherein the heartbeat information is sent to each of the to-be-monitored probes at intervals of the preset duration, wherein the to-be-monitored probes refer to probes connected to a honeypot host, the N to-be-monitored probes are located at N service machines respectively, N is an integer greater than or equal to 1, and each probe is used to acquire and forward a service address of a corresponding service machine;

acquiring feedback information returned by M to-be-monitored probes, determining that the M to-be-monitored probes are active probes, wherein the active probes are properly functioning probes, and M is an integer greater than or equal to 1 and less than or equal to N;

determining at least one newly added probe in the M active probes, wherein the newly added probe is a probe corresponding to a newly added service machine for which a corresponding honeypot container has not been created;

acquiring each newly added service address transmitted by each newly added probe respectively:

creating a honeypot container corresponding to the each newly added service machine respectively, based on the each newly added service address;

acquiring attack traffic for a service machine;

forwarding the attack traffic to a honeypot container corresponding to the service machine, wherein a container address of the honeypot container is the same as a service address of the service machine, the service address is a network address of the service machine, and the container address is a network address of the honeypot container; and returning virtual data generated by the honeypot container, wherein the virtual data is data requested by the attack traffic, and the virtual data comprises the container address.

* * * * *